(12) United States Patent
Nogami et al.

(10) Patent No.: US 9,090,848 B2
(45) Date of Patent: Jul. 28, 2015

(54) GREASE COMPOSITION AND MOTION GUIDING DEVICE LUBRICATED BY GREASE COMPOSITION

(75) Inventors: Akira Nogami, Tokyo (JP); Terumoto Hayami, Tokyo (JP); Hiroshi Sampei, Tokyo (JP); Yukitoshi Fujinami, Ichihara (JP); Kouji Takane, Ichihara (JP)

(73) Assignees: THK CO., LTD., Tokyo (JP); IDEMITSU KOSAN CO., LTD., Tokyo (JP)

( * ) Notice: Subject to any disclaimer, the term of this patent is extended or adjusted under 35 U.S.C. 154(b) by 22 days.

(21) Appl. No.: 14/111,733

(22) PCT Filed: Apr. 11, 2012

(86) PCT No.: PCT/JP2012/059921
§ 371 (c)(1),
(2), (4) Date: Oct. 14, 2013

(87) PCT Pub. No.: WO2012/141222
PCT Pub. Date: Oct. 18, 2012

(65) Prior Publication Data
US 2014/0045733 A1  Feb. 13, 2014

(30) Foreign Application Priority Data

Apr. 15, 2011 (JP) ................................ 2011-090596

(51) Int. Cl.
*C10M 169/06* (2006.01)
*C10M 117/04* (2006.01)
(Continued)

(52) U.S. Cl.
CPC ........... *C10M 141/12* (2013.01); *C10M 169/00* (2013.01); *C10M 169/02* (2013.01);
(Continued)

(58) Field of Classification Search
CPC ............. C10M 141/12; C10M 169/02; C10M 169/00; C10M 2207/1276; C10M 2219/044; C10M 2203/1025; C10M 2215/064; C10M 2205/0285; C10M 2219/086; C10M 2207/126; C10M 2227/066; C10M 2207/0406; C10M 2207/2805; C10M 2203/1006; C10M 2223/045; C10M 2219/068; C10M 2207/01; C10M 2207/1285; F16C 33/6633; F16C 19/362; F16C 29/06; C10N 2230/64; C10N 2250/10; C10N 2240/20; C10N 2240/06; C10N 2230/06; C10N 2230/02; C10N 2210/01; C10N 2210/06; C10N 2210/02
See application file for complete search history.

(56) References Cited

U.S. PATENT DOCUMENTS 4,597,881 A * 7/1986 Iseya et al. ..................... 508/512
4,932,922 A * 6/1990 Girguis .......................... 464/111
(Continued)

FOREIGN PATENT DOCUMENTS

EP  2554644 A1  2/2013
GB  2278612 A  7/1994
(Continued)

OTHER PUBLICATIONS

Notification of Transmittal of Translation of the International Preliminary Report on Patentabililty (Form PCT/IB/338) of International Application No. PCT/JP2012/059921 mailed Oct. 24, 2013 with Forms PCT/IB/373 and PCT/ISA/237.
(Continued)

*Primary Examiner* — Pamela H Weiss
(74) *Attorney, Agent, or Firm* — Westerman, Hattori, Daniels & Adrian, LLP

(57) ABSTRACT

The grease composition for a clean environment includes, a base oil, a thickener and a extreme-pressure agent, in which a kinetic viscosity of the base oil at 40° C. is 100~300 mm²/s, the thickener comprising a lithium complex soap, a content of the thickener is 10~40 mass % with respect to the total amount of the grease composition.

5 Claims, 5 Drawing Sheets

(51) Int. Cl.
*C10M 137/10* (2006.01)
*C10M 137/06* (2006.01)
*C10M 141/12* (2006.01)
*F16C 33/66* (2006.01)
*C10M 169/00* (2006.01)
*C10M 169/02* (2006.01)
*F16C 19/36* (2006.01)
*F16C 29/06* (2006.01)

(52) U.S. Cl.
CPC .... *F16C33/6633* (2013.01); *C10M 2203/1006* (2013.01); *C10M 2203/1025* (2013.01); *C10M 2205/0285* (2013.01); *C10M 2207/0406* (2013.01); *C10M 2207/126* (2013.01); *C10M 2207/1265* (2013.01); *C10M 2207/1276* (2013.01); *C10M 2207/1285* (2013.01); *C10M 2207/2805* (2013.01); *C10M 2215/064* (2013.01); *C10M 2219/044* (2013.01); *C10M 2219/068* (2013.01); *C10M 2219/086* (2013.01); *C10M 2223/045* (2013.01); *C10M 2227/066* (2013.01); *C10N 2220/022* (2013.01); *C10N 2230/02* (2013.01); *C10N 2230/06* (2013.01); *C10N 2230/64* (2013.01); *C10N 2240/06* (2013.01); *C10N 2240/20* (2013.01); *C10N 2250/10* (2013.01); *F16C 19/362* (2013.01); *F16C 29/06* (2013.01)

(56) References Cited

U.S. PATENT DOCUMENTS

| | | | | |
|---|---|---|---|---|
| 5,391,309 | A * | 2/1995 | Brewster et al. | 508/512 |
| 5,516,439 | A * | 5/1996 | Takeuchi et al. | 508/374 |
| 5,783,531 | A | 7/1998 | Andrew et al. | |
| 5,851,969 | A | 12/1998 | Andrew et al. | |
| 2006/0101935 | A1 * | 5/2006 | Nakatani et al. | 74/424.88 |
| 2007/0072779 | A1 | 3/2007 | Nagahora et al. | |
| 2007/0220997 | A1 * | 9/2007 | Nakatani et al. | 74/89 |
| 2007/0265177 | A1 * | 11/2007 | Michioka et al. | 508/391 |
| 2009/0247437 | A1 * | 10/2009 | E. et al. | 508/362 |
| 2011/0041638 | A1 | 2/2011 | Fujinami et al. | |
| 2011/0143973 | A1 * | 6/2011 | Ohno et al. | 508/100 |
| 2012/0098269 | A1 * | 4/2012 | Fujinami | 290/55 |

FOREIGN PATENT DOCUMENTS

| | | |
|---|---|---|
| JP | 01-170691 A | 7/1989 |
| JP | 05-086392 A | 4/1993 |
| JP | 06-330070 A | 11/1994 |
| JP | 09-255984 A | 9/1997 |
| JP | 11-166191 A | 6/1999 |
| JP | 2003-055680 A | 2/2003 |
| JP | 2005-272764 A | 10/2005 |
| JP | 2008-143927 A | 6/2008 |
| JP | 2009-256401 A | 11/2009 |
| WO | 2010/013398 A1 | 2/2010 |
| WO | WO 2010013398 A1 * | 2/2010 |
| WO | 2010/150726 A1 | 12/2010 |
| WO | WO 2010150726 A1 * | 12/2010 |

OTHER PUBLICATIONS

International Search Report of PCT/JP2012/059921, mailing date of Jun. 26, 2012.

Extended European Search Report dated Sep. 22, 2014, issued in corresponding European Application No. 12771351.9. (7 pages).

* cited by examiner

SPEED 100 mm/s (1200 min$^{-1}$)

SPEED 300 mm/s (3600 min$^{-1}$)

GREASE COMPOSITION AND MOTION GUIDING DEVICE LUBRICATED BY GREASE COMPOSITION

TECHNICAL FIELD

The present invention relates to a grease composition for a clean environment and to a motion guiding device that is lubricated by this grease composition for a clean environment.

BACKGROUND ART

Semiconductor production equipment, liquid crystal production equipment, electronic computers, printed substrate production equipment, and so forth generally carry out production in a clean environment such as a clean room. Greases with a reduced oil scattering behavior at the lubricated part, i.e., with a reduced amount of dust emission, are preferably used as the grease filled as the lubricant in the motion guiding devices (for example, table devices that use linear guides, ball screws, rolling bearings, or cross roller rings) that are incorporated in devices used in such environments.

As the precision equipment workpieces, e.g., glass substrates, transported by clean robots have grown in size, the clean robots that transport such precision equipment workpieces have also grown in size. In addition to the low dust emission behavior mentioned above, a high load bearing capacity is therefore also required of the grease for lubricating a motion guiding device incorporated in a large-scale clean robot. A large amount of so-called flaking is produced in the Z-axis of the clean robot and on components in indirect regions when a grease with a low load bearing capacity is used to lubricate a motion guiding device incorporated in a large-scale clean robot.

Fluorinated greases are already known to be greases that exhibit an excellent performance in terms of a low dust emission behavior. Greases that use a perfluoropolyether (PFPE) as the base oil and a polytetrafluoroethylene (PTFE) with a prescribed particle diameter as the thickener are generally commercially available. Greases that use a PFPE base oil certainly exhibit an excellent dust emission behavior, but the PFPE used as the base oil is expensive and high production costs have thus been a problem when PFPE is used for grease production. The load bearing capacity of these fluorinated greases has also been a problem.

The lubricating grease provided in Patent Document 1 is a grease that has an excellent performance with regard to low dust emission; this lubricating grease incorporates a mineral oil or a poly-α-olefin as its base oil and incorporates lithium stearate and lithium 12-hydroxystearate as thickeners. A grease is provided in Patent Document 2 that incorporates a synthetic hydrocarbon oil or an ether oil as its base oil and a urea compound as a thickener and that has a metal element content and worked penetration in prescribed ranges. A grease composition is provided in Patent Document 3 that uses an ester-type base oil and a poly-α-olefin as its base oil and an aliphatic diurea as a thickener.

However, the load bearing capacity has also been a problem for these low dust-emission greases.

The art of incorporating an extreme-pressure agent as an additive for the purpose of raising the load bearing capacity of grease compositions is generally known. However, the dust emission behavior may deteriorate when an extreme-pressure agent is added to a grease composition, and it has been quite difficult to prepare a grease composition that satisfies both the demand for a low dust emission behavior and the demand on the load bearing capacity.

Against this background, research and development has also been carried out into grease compositions that would be endowed with an excellent load bearing capacity and an excellent performance with regard to low dust emission. A grease composition is provided in Patent Document 4 that takes the load bearing capacity into account in addition to a low dust emission behavior; this grease composition uses a poly-α-olefin having a kinematic viscosity at 40° C. of 60 to 320 mm$^2$/s for its base oil and uses a lithium salt of a hydroxyl group-free $C_{10-22}$ fatty acid as a thickener. However, there is still room for additional improvement in the load bearing capacity even with this grease composition.

Patent Document 1: Japanese Patent Application Laid-open No. H6-330070
Patent Document 2: Japanese Patent Application Laid-open No. H11-166191
Patent Document 3: Japanese Patent Application Laid-open No. 2005-272764
Patent Document 4: Japanese Patent Application Laid-open No. 2009-256401

DISCLOSURE OF THE INVENTION

As noted above, in addition to a low dust emission behavior, a high load bearing capacity is required of a grease composition for lubricating a motion guiding device that is incorporated in a large-scale clean robot that operates in a clean environment. While the conventional art is excellent with regard to having a low dust emission behavior, the problem has been that it permits only the selection of either a grease composition that does not have a load bearing capacity that can withstand use in a large-scale clean robot, or a grease composition that has a high load bearing capacity but which entails some sacrifice in the behavior related to dust emission.

The present invention solves the problem identified above by providing a grease composition that has a sufficiently low dust emission behavior for use in a clean environment, for example, a clean room, and that has a load bearing capacity sufficient for lubricating a motion guiding device that is incorporated in a large-scale clean robot.

As a result of extensive and intensive research in order to solve the problem identified above, the present inventors discovered that, with regard to a clean-environment grease composition that comprises a base oil, a thickener, and an extreme-pressure agent, this problem could be solved by having the kinematic viscosity of the base oil at 40° C. be 100 to 300 mm$^2$/s, having a lithium complex soap incorporated as the thickener, and having the thickener content be 10 to 40 mass % with respect to the total amount of the composition.

The present invention relates to the following grease composition: a grease composition for a clean environment, that comprises a base oil, a thickener, and an extreme-pressure agent, wherein the kinematic viscosity of the base oil at 40° C. is 100 to 300 mm$^2$/s, a lithium complex soap is incorporated as the thickener, and the thickener content is 10 to 40 mass % with respect to the total amount of the composition.

The present invention can provide a grease composition that exhibits both a high load bearing capacity and an excellent performance with regard to low dust emission, when used to lubricate a device subject to high loading, for example, a large-scale manufacturing robot, in particular at a manufacturing facility where stringent air conditioning management is exercised.

BRIEF DESCRIPTION OF THE DRAWINGS

FIG. 1-1 is a diagram that shows the results, according to the dust emission measurement 1, for the amount of dust emission for the grease composition of Example 1, wherein FIG. 1-1(a) shows the results for a rotation rate of 1200 min$^{-1}$ and FIG. 1-1(b) shows the results for a rotation rate of 3600 min$^{-1}$;

FIG. 1-2 is a diagram that shows the results, according to the dust emission measurement 1, for the amount of dust emission for the grease composition of Comparative Example 1, wherein FIG. 1-2(a) shows the results for a rotation rate of 1200 min$^{-1}$ and FIG. 1-2(b) shows the results for a rotation rate of 3600 min$^{-1}$;

FIG. 2 is a diagram that shows a first embodiment of a motion guiding device that can use the clean-environment grease of the present invention;

FIG. 5 is a diagram that shows an embodiment of a motion guiding mechanism that can use the clean-environment grease of the present invention, wherein FIG. 5(a) is a front elevation view in partial cross section and FIG. 5(b) is a side view in partial cross section.

MODE FOR CARRYING OUT THE INVENTION

Figure 1:
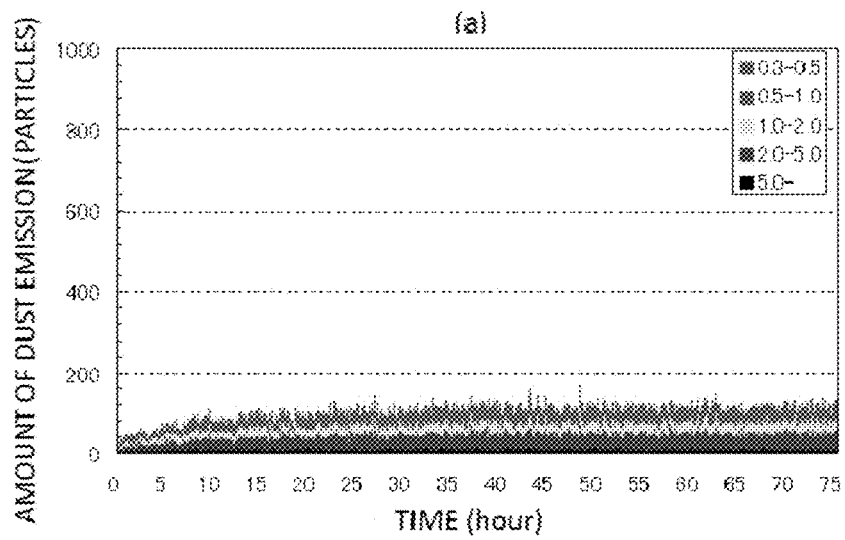
Figure 1:
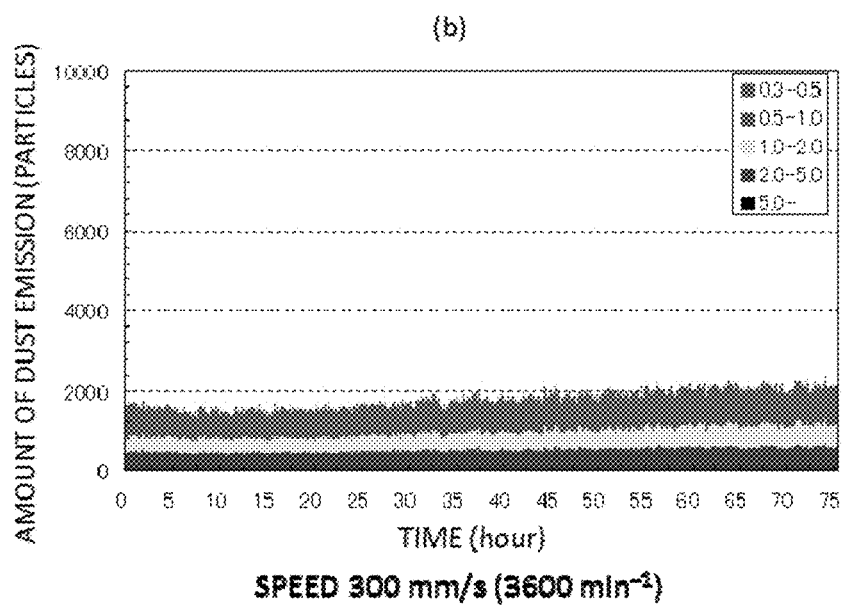

The present invention is specifically described in the following using an embodiment, but the present invention is not limited to or by this.

<The Base Oil>

The kinematic viscosity at 40° C. of the base oil incorporated in the clean-environment grease composition of this embodiment (also referred to hereafter as the grease composition of this embodiment or simply as the grease composition) is 100 to 300 mm$^2$/s (cSt). When the kinematic viscosity of the base oil at 40° C. is less than 100 mm$^2$/s, the load bearing capacity may decline and a low dust emission behavior may not be adequately expressed. When, on the other hand, the kinematic viscosity of the base oil at 40° C. exceeds 300 mm$^2$/s, the wear resistance under microoscillatory conditions may decline and fretting wear may then increase. In addition, a low dust emission performance and a high load bearing capacity can be obtained by having the kinematic viscosity at 40° C. of the base oil in the grease composition be in the indicated range.

The kinematic viscosity of the base oil at 40° C. is more preferably 115 to 290 mm$^2$/s and is particularly preferably 150 to 260 mm$^2$/s.

On the other hand, the kinematic viscosity at 100° C. of the base oil incorporated in the clean-environment grease composition of this embodiment is preferably 13 to 41 mm$^2$/s not only because this provides an excellent load bearing capacity, but also from the standpoint of ensuring the wear resistance and ensuring a low dust emission performance. The kinematic viscosity of the base oil at 100° C. is more preferably 15 to 39 mm$^2$/s and is particularly preferably 18 to 35 mm$^2$/s.

A combination of a plurality of the below-described base oils that will provide kinematic viscosities at 40° C. and 100° C. in the above-indicated ranges can be used for the base oil incorporated in the grease composition of the present invention.

The kinematic viscosity of the base oil at 40° C. and at 100° C. can be determined by the method established in JIS K 2283.

Any base oil that can be adjusted to provide a kinematic viscosity at 40° C. of 100 to 300 mm$^2$/s can be used without particular limitation as the base oil incorporated in the clean-environment grease composition of this embodiment.

The content of this base oil, expressed with respect to the total amount of the grease composition, is preferably 40 to 95 mass %, while 60 to 90 mass % is preferred from the standpoint of adjusting the content of the lithium complex soap into the prescribed range set by the present invention.

Examples are poly-α-olefins (PAO) such as polybutene, 1-octene oligomer, 1-decene oligomer, and 1-dodecene oligomer and their hydrogenates (including α-olefin copolymers) and hydrocarbon-type synthetic oils such as the cooligomers of 1-decene and ethylene.

Poly-α-olefins are preferred for the base oil because they exhibit little dust emission, provide a composition that undergoes little viscosity variation with respect to temperature variations, and are resistant to property changes over a wide temperature range.

Expressed with respect to the total amount of the base oil, the hydrocarbon-type synthetic oil is incorporated in the clean-environment grease composition of this embodiment preferably at least 50 mass %, more preferably at least 55 mass %, and particularly preferably at least 60 mass %.

Insofar as the effects of the present invention are not impaired, another synthetic oil, a mineral oil, or a plant or animal oil may additionally be incorporated as a base oil in the clean-environment grease composition of this embodiment. Various heretofore known synthetic oils may be used as the other synthetic oil; for example, esters, phosphate esters, polyethers, alkyldiphenyl ethers, alkylpolyphenyl ethers, diphenyl ethers, alkylbenzenes, alkylnaphthalenes, polyoxyalkylene glycols, neopentyl glycol, and silicone oils can be used.

The ester oils can be exemplified by diester oils such as dibutyl sebacate, di-2-ethylhexyl sebacate, dioctyl adipate, diisodecyl adipate, ditridecyl adipate, ditridecyl glutarate, and methyl acetyl ricinolate; aromatic ester oils such as trioctyl trimellitate, tridecyl trimellitate, and tetraoctyl pyromellitate; polyol ester oils such as trimethylolpropane caprylate, trimethylolpropane pelargonate, pentaerythritol 2-ethylhexanoate, and pentaerythritol pelargonate; and complex ester oils that are oligoesters from a polyhydric alcohol and a dibasic acid/monobasic acid mixed fatty acid.

The polyethers encompass polyglycols, polyoxyalkylene glycols, polyphenyl ethers, and alkylphenyl ethers such as alkylphenyl ethers, dialkyldiphenyl ethers, and tetraalkyldiphenyl ethers, whereamong the use of alkylphenyl ethers is preferred.

Various heretofore known mineral oils can be used as the mineral oil, for example, paraffin base mineral oils, intermediate base mineral oils, and naphthene base mineral oils. Among these, paraffin base mineral oils having a paraffin fraction of at least 80 mass % are preferably used.

The animal oils can be exemplified by whale oil and squalane.

Various heretofore known plant oils can be used as the plant oil, for example, rapeseed oil, corn oil, sunflower oil, and castor oil.

Among the preceding base oils, at least one selected from the group consisting of mineral oils having a paraffin fraction of at least 80 mass %, hydrocarbon-type synthetic oils, ester oils, and alkylphenyl ethers is preferred from the standpoint of achieving an even better expression of the effects of the present invention and ensuring the lubricity.

Viewed from the standpoint of achieving a more efficient mixing of the thickener in the grease composition of this embodiment and a favorable adjustment of the kinematic viscosity of the base oil in the grease composition, a higher viscosity base oil with a kinematic viscosity at 40° C. of 350 to 1600 mm$^2$/s is preferably formulated such that this base oil makes up at least 25 mass %, with respect to the total amount of the base oil, of the base oil of the grease composition in this embodiment. The kinematic viscosity at 40° C. of this higher viscosity base oil is more preferably 360 to 1600 mm$^2$/s and is particularly preferably 370 to 1400 mm$^2$/s.

The use of two types of base oils, for example, a higher viscosity base oil and a lower viscosity base oil, in the grease composition of this embodiment can be exemplified by a mode in which a higher viscosity base oil having a kinematic viscosity at 40° C. of 350 to 1600 mm$^2$/s is incorporated, considered with respect to the total amount of the base oil, at 25 to 80 mass %, preferably 35 to 75 mass %, and particularly preferably 60 to 75 mass % with the remainder being a lower viscosity base oil having a kinematic viscosity at 40° C. of less than 350 mm$^2$/s, more preferably 10 to 200 mm$^2$/s, and particularly preferably 25 to 100 mm$^2$/s.

By using such a mode in which the base oil in the grease composition of this embodiment is obtained by mixing in particular a higher viscosity base oil having a kinematic viscosity at 40° C. of 350 to 1600 mm$^2$/s with a lower viscosity base oil of less than 350 mm$^2$/s wherein at least 25 mass % of the base oil as a whole is the higher viscosity base oil, not only can the worked penetration of the grease composition of this embodiment be controlled into a favorable range, but the content of the lithium complex soap—which has heretofore been resistant to incorporation at high contents within such a worked penetration range—can be raised.

<The Thickener>

The clean-environment grease composition of this embodiment incorporates a lithium complex soap as a thickener.

The lithium complex soap is obtained by the reaction of lithium hydroxide with (1) a fatty acid and (2) a complexing agent.

The fatty acid constituting the lithium complex soap in this embodiment can be exemplified by hydroxycarboxylic acids and monocarboxylic acids. At least 50 mass % of the fatty acid constituting the lithium complex soap is preferably a hydroxycarboxylic acid in the grease composition of this embodiment. An even better dust emission behavior and load bearing capacity are obtained by having at least 50 mass % of the fatty acid constituting the lithium complex soap be a hydroxycarboxylic acid.

The hydroxycarboxylic acid content in the fatty acid constituting the lithium complex soap is more preferably at least 80 mass % and particularly preferably is 100 mass %.

The hydroxycarboxylic acid can be exemplified by $C_{12-22}$ monohydroxycarboxylic acids. The aforementioned monocarboxylic acid can be exemplified by $C_{12-22}$ monocarboxylic acids.

The complexing agent, on the other hand, is preferably a substance selected from $C_{6-16}$ aliphatic dicarboxylic acids, aromatic dicarboxylic acids, and salicylic acid. The use of such combinations contributes to a low dust emission behavior and a high load bearing capacity by the grease composition of this embodiment.

The monocarboxylic acid can be exemplified by lauric acid, myristic acid, palmitic acid, stearic acid, oleic acid, linoleic acid, arachidic acid, and behenic acid; the monohydroxycarboxylic acid can be exemplified by 12-hydroxystearic acid; the aliphatic dicarboxylic acid can be exemplified by dodecanedioic acid, azelaic acid, adipic acid, and sebacic acid; and the aromatic carboxylic acid can be exemplified by phthalic acid, m-phthalic acid, terephthalic acid, benzoic acid, and salicylic acid.

A single one of these may be used by itself or two or more may be used in combination.

Among the preceding, the use of 12-hydroxystearic acid as the fatty acid constituting the lithium complex soap and the use of a $C_{6-10}$ aliphatic dicarboxylic acid as the complexing agent is particularly preferred for generating the effects of the present invention.

When a carboxylic acid selected from $C_{12-22}$ monohydroxycarboxylic acids is selected as the carboxylic acid used as the complexing agent, the acid is used at an amount that provides a weight ratio with respect to that carboxylic acid of preferably 0.1 to 5.0 and more preferably 0.2 to 2.5.

Insofar as the effects of the present invention are not impaired, for example, a soap-type thickener other than the lithium complex soap, a fluororesin-type thickener, an inorganic thickener, a carbon-type thickener, and so forth, may be incorporated in the present invention. Considered with respect to the overall amount of the thickener, the content of the lithium complex soap is preferably at least 80 mass %, more preferably at least 90 mass %, and particularly preferably is 100 mass % in the grease composition of this embodiment.

The soap-type thickener other than the above-described lithium complex soap can be exemplified by metal soap thickeners obtained by the reaction of a carboxylic acid (including glycerides) with a metal hydroxide, e.g., calcium soaps, aluminum soaps, sodium soaps, lithium soaps, magnesium soaps, and zinc soaps, and by complex soap thickeners such as calcium complex soaps, aluminum complex soaps, and sodium complex soaps.

When a complex soap is selected, the carboxylic acid used as the complexing agent is used at a weight ratio of preferably 0.1 to 5.0 and more preferably 0.2 to 2.5 with respect to the carboxylic acid (fatty acid) not used as the complexing agent.

The content of the thickener in the grease composition of this embodiment ranges from 10 to 40 mass % with respect to the total amount of the grease composition. Within this range, a low dust emission behavior can be secured; a worked penetration frequently used for greases can be readily obtained; and a favorable torque and sliding resistance can be achieved for the grease. In addition, in order to improve the low dust emission performance still further, the thickener content is more preferably 15 to 35 mass % and particularly preferably is 17 to 27 mass %.

The grease composition of this embodiment incorporates a lithium complex soap as a thickener, and the total amount of the complexing agent and the fatty acid component constituting this lithium complex soap is calculated for the content of the lithium complex soap serving as a thickener. The content is similarly calculated when other soap-type thickeners are also incorporated.

The grease composition of this embodiment also contains an extreme-pressure agent. This extreme-pressure agent can be exemplified by phosphorus-type extreme-pressure agents such as phosphate esters, acidic phosphate esters, phosphite esters, acidic phosphite esters, and amine salts of the preceding; sulfur-type extreme-pressure agents such as sulfurized fats and oils, thiadiazole compounds, dialkyl disulfides, and methylenebisdialkyldithiocarbamates; and organometal compounds such as molybdenum dithiocarbamate, molybdenum dithiophosphate, zinc dithiocarbamate, zinc dithiophosphate, and nickel dithiocarbamate.

Among the preceding, extreme-pressure agents constituted of organometal compounds are preferably used, while the use of combinations of one or more selections from the group consisting of molybdenum dithiocarbamates, molybdenum dithiophosphates, zinc dithiocarbamates, and zinc dithiophosphates is more preferred in terms of obtaining a friction-reducing effect and a wear-preventing effect.

Viewed from the standpoint of maintaining a low dust emission performance, the content of the extreme-pressure agent, considered with respect to the total amount of the grease composition, is preferably not more than 10.0 mass % and more preferably is not more than 6.0 mass %. On the other hand, when considered in terms of generating the effects of an extreme-pressure agent, the content of the extreme-pressure agent is preferably at least 0.1 mass % and is more preferably at least 0.5 mass %.

The grease composition of this embodiment may additionally contain those additives in common use in grease compositions.

These additives can be exemplified by antioxidants (for example, alkylated diphenylamines such as p,p'-dioctyldiphenylamine, amine-type antioxidants such as phenyl-α-naphthylamine and alkylated α-naphthylamines; and phenolic antioxidants such as 2,6-di-t-butyl-4-methylphenol and 4,4'-methylenebis(2,6-di-t-butylphenol)); corrosion inhibitors (for example, metal sulfonates such as calcium sulfonate, lanolin derivatives, sodium nitrite, succinate esters, zinc salts of fatty acids, amines, and sorbitan monooleate), structure stabilizers, metal deactivators (for example, benzotriazole), wear reducers (for example, phosphate esters, dithiocarbamate esters), and solid lubricants (for example, polyimides, PTFE, graphite, metal oxides, boron nitride, melamine cyanurate, and molybdenum disulfide).

A single additive may be used by itself or a mixture of two or more may be used. When the grease composition of this invention contains an additive other than the extreme-pressure agent, its content is preferably 0.3 mass % to 10.0 mass %.

<The Method of Preparing the Grease Composition of this Embodiment>

The grease composition of this embodiment may be prepared using those procedures commonly used in the relevant technical field; however, a method that encompasses the following steps is an example for the incorporation of a high content of the lithium complex soap thickener.

This method, for example, encompasses (1) a first reaction step in which the base oil and fatty acid are mixed and this is reacted with an aqueous lithium hydroxide solution of lithium hydroxide; (2) a second reaction step in which the complexing agent is added and mixed into the reaction product obtained in (1) and this mixture is reacted with an aqueous lithium hydroxide solution; (3) a step in which the reaction product obtained in (2) is heated and stirred, the remaining base oil is then added, and cooling is carried out; and a finishing step in which the obtained grease is made uniform using a roll mill or colloid mill.

An example of another method is a method encompassing (1) a step in which a portion of the base oil is mixed with the fatty acid and complexing agent and this mixture is reacted with an aqueous lithium hydroxide solution all at once; (2) a step in which the reaction product obtained in (1) is heated and stirred and the remaining base oil is subsequently added and cooling is carried out; and (3) a finishing step in which the obtained grease is made uniform using a roll mill or colloid mill.

The kinematic viscosity at 40° C. of the base oil used in the reaction of the lithium hydroxide with the fatty acid and complexing agent is preferably adjusted to be at least 250 mm$^2$/s at the time of lithium complex soap production in order to adjust the lithium complex soap content into the prescribed range set by the present invention. The kinematic viscosity at 40° C. of the base oil at this point is more preferably at least 300 mm$^2$/s and particularly preferably is at least 350 mm$^2$/s.

As explained above, a lithium complex soap is incorporated as a thickener in the grease composition of this embodiment, and the step of incorporating the lithium complex soap in this grease composition preferably includes a step in which the reaction between the lithium hydroxide and carboxylic acid (fatty acid and complexing agent) is carried out in a base oil having a kinematic viscosity at 40° C. of 250 to 1600 mm$^2$/s. Including such a step makes it possible for the grease composition to incorporate a high content of a thickener, such as a lithium complex soap, that has heretofore been difficult to incorporate in a grease composition at a high content level.

<The Grease Composition of this Embodiment>

Viewed in terms of inhibiting oil scatter, the grease composition of this embodiment preferably has a consistency (worked penetration) at 25° C. of 200 to 400, more preferably 220 to 350, and particularly preferably 250 to 340. Substantial oil scatting occurs when this worked penetration is too high, while, on the other hand, the torque and sliding resistance increase when it is too low and the functionality characteristic of a grease is then not expressed.

This consistency can be measured using the method specified in JIS K 2220.

The consistency of the grease composition can be adjusted by adjusting the content of the hereinabove-described thickener, and this content can be adjusted, as described in the preceding, by using the combination of a higher viscosity base oil with a lower viscosity base oil as the base oil used in the reaction that produces the lithium complex soap that is incorporated as a thickener.

In addition, in order to retard grease scattering under high speed/high acceleration conditions, the grease composition of this embodiment has a dropping point preferably of at least 200° C., more preferably at least 220° C., and particularly preferably at least 240° C. The dropping point of the grease composition is, on the other hand, preferably not more than 1000° C.

The dropping point of the grease composition can be measured according to JIS K 2220:2003.

<The Clean Environment>

The clean environment referenced by the present invention refers to an environment having a cleanliness class of class 3 or larger (a smaller numerical value for the class indicates a higher level of cleanliness) in a clean room as defined by ISO 14644-1. Such clean environments can be exemplified by the industrial clean rooms that are used for the production of, for example, semiconductors, electronic equipment and machinery, and precision equipment and machinery, in which substances suspended in the air, e.g., dust, are subjected to control. The grease composition of this embodiment can be used in such a clean environment.

The present invention is described even more specifically by the examples provided below, but these in no way limit the present invention.

<Production of the Grease Compositions>

EXAMPLE 1

(1) A higher viscosity base oil (PAO-A), 12-hydroxystearic acid, azelaic acid, and a corrosion inhibitor in the amounts shown in Table 1 were heated to 95° C. in a reaction kettle while stirring.

(2) Lithium hydroxide (hydrate) in the amount shown in Table 1 was dissolved in 5-fold (mass ratio) water. This aqueous solution was blended into the solution of (1) and mixing and heating were carried out. Holding was performed for 5 minutes once the temperature of the mixture had reached 195° C.

(3) Then, after blending the lower viscosity base oil (PAO-B), cooling was carried out to 60° C. at 50° C./hour and the antioxidant and extreme-pressure agent in the amounts shown in Tables 1 and 2 were added with mixing.

(4) After natural cooling to room temperature, a finishing treatment was performed using a three-roll apparatus to obtain the grease composition of Example 1.

Production was carried out in Examples 2 to 7 as in Example 1, but changing the thickener content or the kinematic viscosity of the base oil incorporated in the grease composition. On the other hand, production in Comparative Examples 1 to 3 was carried out using the procedure given below, while production was carried out in Comparative Examples 4 to 7 as in Example 1, but changing the thickener content or the kinematic viscosity of the base oil incorporated in the grease composition.

COMPARATIVE EXAMPLE 1

(1) PAO-C, 12-hydroxystearic acid, stearic acid, and a corrosion inhibitor in the amounts shown in Table 1 were introduced into a reaction kettle and heated to 95° C. to effect dissolution.

(2) Lithium hydroxide (monohydrate) in the amount shown in Table 1 was dissolved in 5-fold (mass ratio) water. This aqueous solution was blended into the solution of (1) and mixing and heating were carried out. Holding was performed for 5 minutes once the temperature of the mixture had reached 205° C.

(3) Then, after blending in mineral oil-A, cooling was carried out to 60° C. at 50° C./hour and the antioxidant in the amount shown in Table 1 was added with mixing.

(4) After natural cooling to room temperature, a finishing treatment was performed using a three-roll apparatus to obtain the grease composition of Comparative Example 1.

COMPARATIVE EXAMPLE 2

(1) 50 mass % of mineral oil-B, 11 mass % of 12-hydroxystearic acid, and a corrosion inhibitor were introduced into a reaction kettle and heated to 95° C. to effect dissolution.

(2) 1 mass % of lithium hydroxide (monohydrate) in the amount shown in Table 1 was dissolved in 5-fold (mass ratio) water relative to the lithium hydroxide. This aqueous solution was added to the solution of (1) and a reaction was carried out with heating and mixing. Holding was performed for 5 minutes once the temperature of the mixture had reached 205° C.

(3) Then, after the addition of mineral oil-C and the remaining amount (21.3 mass %) of mineral oil-B, cooling was carried out to 60° C. at 50° C./hour and the antioxidant was added with mixing.

(4) After natural cooling to room temperature, a finishing treatment was performed using a three-roll apparatus to obtain the grease composition of Comparative Example 2.

COMPARATIVE EXAMPLE 3

(1) Mineral oil-B, 12-hydroxystearic acid, and a corrosion inhibitor in the amounts shown in Table 1 were introduced into a reaction kettle and heated to 95° C. to effect dissolution.

(2) Lithium hydroxide (monohydrate) in the amount shown in Table 1 was dissolved in 5-fold (mass ratio) water. This aqueous solution was blended into the solution of (1) and mixing and heating were carried out. Holding was performed for 5 minutes once the temperature of the mixture had reached 205° C.

(3) Then, after mineral oil-C had been blended in, cooling was carried out to 60° C. at 50° C./hour and the antioxidant and extreme-pressure agent in the amounts shown in Table 1 were added with mixing.

(4) After natural cooling to room temperature, a finishing treatment was performed using a three-roll apparatus to obtain the grease composition of Comparative Example 3.

<Experiment>
(Dust Emission Measurement 1)

The dust emission test was run using a dust emission testing device that incorporated a linear guide (THK Co., Ltd.) that was provided with a ball screw. The shaft diameter of the ball screw was 25 mm; the lead diameter was 5 mm; and the accuracy was C0. The amount of the grease composition fill was 6 cc/nut. The grease composition of Example 1 and the grease composition of Comparative Example 1 were submitted to the dust emission measurement. The results are given in FIGS. 1-1 and 1-2. According to these results, the grease composition of Example 1 exhibited a level 2, vide infra, and the grease composition of Comparative Example 1 exhibited a level 4.

The dust emission testing device: a downflow-type dust emission testing device was used; it was equipped with a particle counter (KC-01D from RION Co., Ltd.) as the measurement instrumentation and with a recorder (GL-200, Graphtec Corporation).

The clean air (temperature 23±1° C., cleanliness: JIS class 2) is supplied within this dust emission testing device using a downflow configuration.

The flow rate at the port is 0.25 m/s and the air sampling rate is 0.5 L/min.

<Operating Conditions for the Dust Emission Testing Device>

The clean air was introduced into the particle counter at a flow rate of 0.25 mL/s while entraining, e.g., the oil fraction scattered from the ball screw and so forth (dust emission). The following operating conditions were used for the ball screw at this point: velocity (1) of 100 mm/s (1200 min$^{-1}$) or velocity (2) of 300 mm/s (3600 min$^{-1}$); acceleration of 2.94 m/s$^2$ (0.3G); 200 mm stroke. The following operating patterns were used: for the velocity (1) of 100 mm/s, the process of three back-and-forth strokes followed by stopping for 3 minutes was repeated; for the velocity (2) of 300 mm/s, the process of driving for 15 seconds and stopping for 180 seconds was repeated.

<Particle Measurement Conditions>

The measurement was carried out for 24 hours or 75 hours by repeating the following: sampling time=75 seconds, intake amount=1 L, stop for 120 seconds.

<Experiment 2>
(Four-Ball Load Bearing Test, Four-Ball Wear Preventive Test, and Fretting Wear Test)

A four-ball load bearing test was performed according to the method specified in ASTM D 2596 on the grease compositions according to Example 1 and Comparative Examples 1 to 3 and the last nonseizure load (LNL), weld load (WL), and load-wear index (LWI) were measured. The results are given in Table 1.

Similarly, for the grease compositions according to Example 1 and Comparative Examples 1 to 3, a four-ball wear preventive test was performed according to ASTM D 2266 and a fretting wear test was performed according to ASTM D 4170. The results of each are given in Table 1.

TABLE 1

| | specification | | Example 1 mass % | Comparative Example 1 mass % | Comparative Example 2 mass % | Comparative Example 3 mass % |
|---|---|---|---|---|---|---|
| thickener | fatty acid | 12-hydroxystearic acid | 12.0 | 5.0 | 11.0 | 15.0 |
| | | stearic acid | — | 18.0 | — | — |
| | complexing agent | azelaic acid | 12.0 | — | — | — |
| lithium hydroxide monohydrate | | | 7.1 | 3.5 | 1.6 | 2.1 |
| additives | antioxidant | | 1.5 | 1.5 | 1.5 | 1.5 |
| | corrosion inhibitor | | 1.0 | 1.0 | 1.0 | 1.0 |
| | extreme pressure agent | ZnDTP | 2.0 | — | — | 2.0 |
| | | MoDTC | 2.0 | — | — | — |
| hydrocarbon- type base oil | higher viscosity base oil | PAO-A | 44.9 | — | — | — |
| | lower viscosity base oil | PAO-B | 17.5 | — | — | — |
| | | PAO-C | — | 15.0 | — | — |
| | mineral oil | mineral oil-A | — | 56.0 | — | — |
| | | mineral oil-B | — | — | 71.3 | 51.0 |
| | | mineral oil-C | — | — | 13.6 | 27.4 |
| total | | | 100.00 | 100.00 | 100.00 | 100.00 |
| Experimental results | | | | | | |
| amount of thickener mass % (*) | | | 24 | 23 | 11 | 15 |
| base oil kinematic viscosity (40° C.) mm$^2$/s | | | 198 | 29.6 | 122.6 | 170 |
| base oil kinematic viscosity (100° C.) mm$^2$/s | | | 23.2 | 5.28 | 12 | 14 |
| worked penetration 25° C., 60 strokes | | | 287 | 211 | 271 | 275 |
| dropping point ° C. | | | 300< | 195 | 168 | 193 |
| four-ball load bearing test | | | | | | |
| last nonseizure load (LNL) N | | | 1569 | 490 | 785 | 785 |
| weld load (WL) N | | | 6080 | 1236 | 1236 | 3089 |
| load-wear index (LWI) N | | | 937 | 218 | 315 | 459 |
| four-ball wear preventive test mm | | | 0.36 | 0.92 | 0.33 | 0.43 |
| fretting wear test (ASTM D4170 method) mg | | | 22 | 38 | 3 | 16 |

(*) The amount of thickener is defined as the total amount of carboxylic acid (fatty acid, complexing agent).

| | |
|---|---|
| antioxidant | p,p'-dioctyldiphenylamine |
| corrosion inhibitor | calcium sulfonate |
| PAO-A | kinematic viscosity (40° C.) = 400 mm$^2$/s, kinematic viscosity (100° C.) = 40.5 mm$^2$/s, density (15° C.) = 0.849 mm$^2$/s |
| PAO-B | kinematic viscosity (40° C.) = 46.8 mm$^2$/s, kinematic viscosity (100° C.) = 7.84 mm$^2$/s, density (15° C.) = 0.830 mm$^2$/s |
| PAO-C | kinematic viscosity (40° C.) = 30.1 mm$^2$/s, kinematic viscosity (100° C.) = 5.78 mm$^2$/s, density (15° C.) = 0.826 mm$^2$/s |
| mineral oil-A | kinematic viscosity (40° C.) = 29.5 mm$^2$/s, kinematic viscosity (100° C.) = 5.15 mm$^2$/s, density (15° C.) = 0.873 mm$^2$/s |
| mineral oil-B | kinematic viscosity (40° C.) = 103 mm$^2$/s, kinematic viscosity (100° C.) = 11.3 mm$^2$/s, density (15° C.) = 0.886 mm$^2$/s |
| mineral oil-C | kinematic viscosity (40° C.) = 434 mm$^2$/s, kinematic viscosity (100° C.) = 20.9 mm$^2$/s, density (15° C.) = 0.927 mm$^2$/s |

The greases in Examples 1 to 7 and Comparative Examples 4 to 7 were prepared by the same method as in Example 1, but using different kinematic viscosities at 40° C. and thickener contents, and, among the tests referenced above, the test measuring the dust emission and the test measuring the weld load were run on these greases. The results are given in Tables 2 and 3.

With reference to Table 2, the kinematic viscosity of the base oil was too low in Comparative Example 4 (kinematic viscosity of the base oil=70 mm$^2$/s) and the fluidity was thus raised, and as a consequence the base oil was scattered out as liquid droplets and the amount of dust emission was then very high. The kinematic viscosity of the base oil was too high in Comparative Example 5 (kinematic viscosity of the base

TABLE 2

| grease production example | base oil PAO kinematic viscosity (40° C.) mm$^2$/s | thickener lithium complex (12-hydroxystearic acid; azelaic acid) content (mass %) | results of the measurement of the amount of dust emission | weld load (N) | worked penetration |
|---|---|---|---|---|---|
| Comparative Example 4 | 70 | 24 | level 4 | 6080 | 276 |
| Example 2 | 120 | 24 | level 3 | 6080 | 280 |
| Example 1 | 198 | 24 | level 2 | 6080 | 289 |
| Example 3 | 270 | 24 | level 3 | 6080 | 280 |
| Comparative Example 5 | 400 | 24 | level 4 | 6080 | 283 | oil=400 mm²/s) and the torque and sliding resistance in the high-speed region were increased and the amount of dust emission was very high.

TABLE 3

| grease production example | base oil PAO kinematic viscosity [40° C.] mm²/s | thickener lithium complex: 12-hydroxystearic acid; azelaic acid content (mass %) | results of the measurement of the amount of dust emission | weld load (N) | worked penetration |
|---|---|---|---|---|---|
| Comparative Example 6 | 200 | 8 | level 4 | 6080 | 450 |
| Example 4 | 200 | 15 | level 3 | 6080 | 348 |
| Example 5 | 200 | 20 | level 2 | 6080 | 290 |
| Example 1 | 198 | 24 | level 2 | 6080 | 287 |
| Example 6 | 200 | 30 | level 2 | 6080 | 295 |
| Example 7 | 200 | 35 | level 2 | 6080 | 200 |
| Comparative Example 7 | 200 | 42 | level 1 | 6080 | 100 |

With respect to Table 3, the worked penetration was too high in Comparative Example 6 (thickener content=8 mass %) and the thickening performance (oil retention performance) was poor and the oil was easily scattered (dust emission) and the amount of dust emission was thus very high. The worked penetration was too low (the grease became too hard) in Comparative Example 7 (thickener content=42 mass %) and the torque and sliding resistance were increased and the behavior characteristic of a grease did not appear and this was not suitable for submission to testing.

The measurement results for the amount of dust emission in Tables 2 and 3 are obtained by expressing the measurement results for the amount of dust emission in Experiment 1 using a level 1-4 evaluation scale created at the THK Co., Ltd. This level 1-4 scale is given below.

level 1: corresponds to JIS class 3
level 2: corresponds to JIS class 4
level 3: corresponds to JIS class 5
level 4: level at which use in a clean environment is not possible It may be understood from the test results given above that the grease composition of this embodiment has a low dust emission behavior sufficiently robust for use in a clean environment and a satisfactory load bearing capacity that can withstand high loads.

There are no particular limitations on the applications of the grease composition of this embodiment, and it may be used, for example, to provide lubricity in motion guiding devices. Specifically, it may be used in a motion guiding device, for example, a linear guide, ball screw, ball spline, and so forth, that is provided with rolling elements (balls or rollers); a drive shaft (for example, a screw shaft) and/or a track shaft (track rail) having a rolling contact surface that supports rolling of the rolling elements; and a moving member (for example, a moving block or a nut element) that has a load rolling element rolling surface for rolling elements facing the aforementioned rolling contact surface, that is disposed on the track shaft or drive shaft with the rolling elements interposed therebetween, and that undergoes a reciprocating motion along the shaft relative thereto.

The use of the grease composition of this embodiment results in lubrication of the rolling contact surface of the track shaft of the motion guiding device and of the load rolling contact surface of the moving member. There are no particular limitations on the method and means for lubricating the motion guiding device using the grease composition of this embodiment.

An example of a linear guide as the motion guiding device is described in the following.

Figures 1, 2:
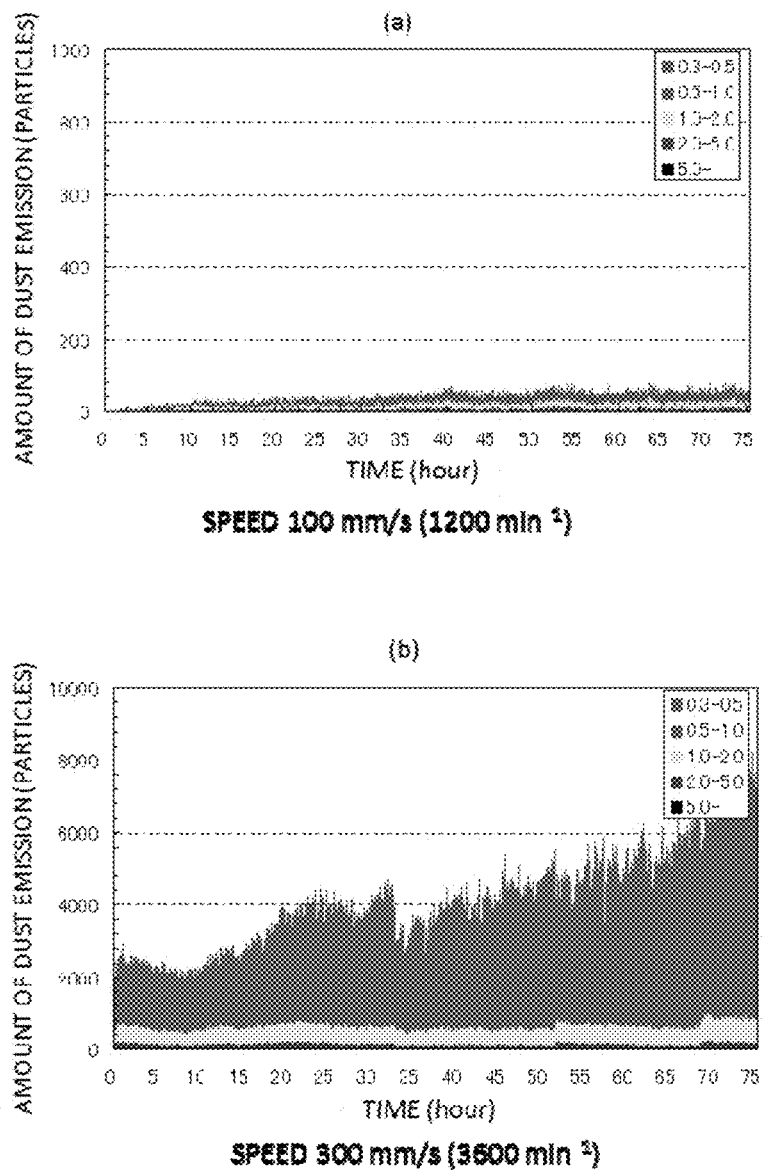
Figure 2:
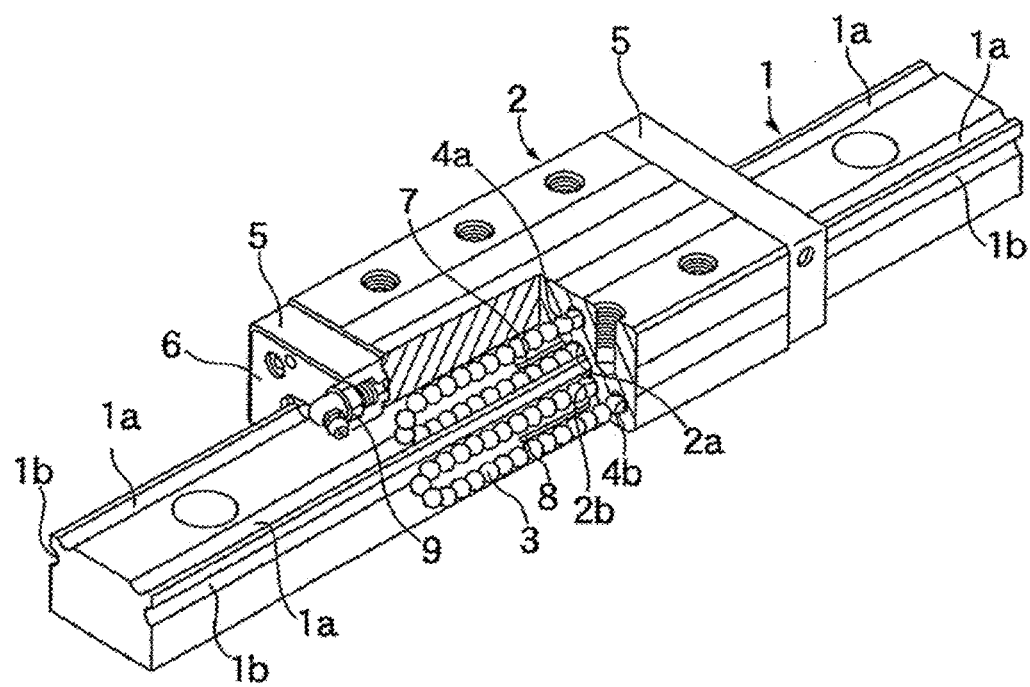

Thus, as shown in FIG. 2, the linear guide has a structure provided with a track rail (1), which is disposed as a track shaft, and with a moving block (2) as a moving member, which is installed to freely undergo reciprocating motion via a plurality of balls (3) disposed in the track rail as rolling elements.

The track rail has a cross section, considered perpendicular to its longitudinal direction, that is approximately rectangular and is provided with bolt holes from the upper surface to the lower surface for attachment by bolts to a base. In addition, two rolling element rolling grooves (1a, 1b) are formed in the vicinity of the corner region defined by the upper surface and either side surface, so as to sandwich the corner region and extending along the entire length in the longitudinal direction of the track rail, thus forming a total of four grooves.

The moving block, on the other hand, is constructed of a moving block main body made of a metal and a pair of plastic covers (5) disposed at the two end surfaces, considered in the direction of motion, of the moving block main body.

Load rolling element rolling grooves (2a, 2b, 4a, 4b) are disposed in the moving block main body in positions that respectively match the rolling element rolling grooves of the track rail. A load rolling element rolling pathway is formed by the rolling element rolling groove of the track rail and the load rolling element rolling groove formed in the moving block main body, and the plurality of balls introduced into this thruway roll while receiving the load. In addition, the moving block main body is provided with a nonload rolling element rolling pathway that runs in parallel to the load rolling element rolling groove. Each of the pair of covers is provided with a turnaround pathway that links an individual nonload rolling element rolling pathway with an individual load rolling element rolling pathway. One infinite circuit is composed of the combination of one load rolling element rolling pathway and one nonload rolling element rolling pathway and the pair of turnaround pathways that connects them.

The moving block can undergo a reciprocating motion relative to the track rail, by the disposition of a plurality of balls in an infinitely circulatable manner in the infinite circuit composed of a load rolling element rolling pathway, a nonload rolling element rolling pathway, and a pair of turnaround pathways.

A grease nipple (9) is provided in either cover (5) in order to supply a grease composition to the turnaround pathway.

The grease composition can be supplied to this linear guide, for example, by loading the grease composition into a grease gun and filling it into the turnaround pathway from the grease nipple (9) of the linear guide.

Figure 3:
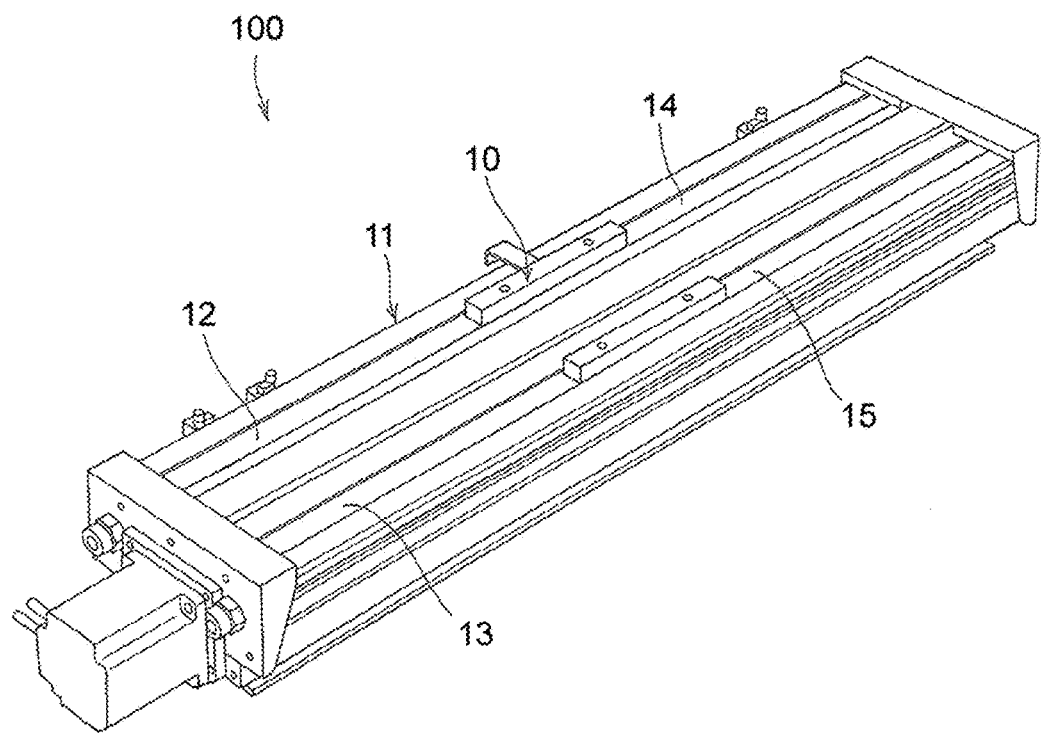
FIG. 3 is a diagram that shows a second embodiment of a motion guiding device that can use the clean-environment grease of the present invention.

The grease composition of this embodiment can also be used with the dustproofing mechanism-equipped linear actuators described in, for example, WO 2009/034804 A1 and WO 2009/020075 A1. The linear actuator (100) of FIG. 3 has a ball screw; a moving stage (10) that has a grease nipple-equipped ball screw nut threadably engaged on the ball screw and that in association with the rotation of the ball screw freely undergoes linear reciprocating motion along the axial direction of the ball screw; a housing member (11) disposed to cover at least the ball screw; openings (12, 13) formed in the housing member along the movement path of the moving stage; and dustproofing belts (14, 15) disposed within the housing member in order to close off the openings. In order to realize movement by the moving stage along the openings while maintaining closure of the openings by the dustproofing belts, a detour means is disposed in the moving stage in order to detour the dustproofing belts, which reside in a position that overlaps with the moving stage. The grease composition of this embodiment can be introduced, using, for example, a glue gun, into the ball screw (not shown) or the linear guide of this linear actuator with the belts removed.

When the grease composition of this embodiment is used in the linear actuator described in WO 2009/020075 A1, which is provided by the further disposition of suction ports in the dustproofing mechanism-equipped linear actuator described above, the amount of suction can be reduced from that previously required while maintaining the same cleanliness as before.

The motion guiding device under consideration also encompasses motion guiding devices that are equipped with the cross roller rings described in the following.

Figure 4:
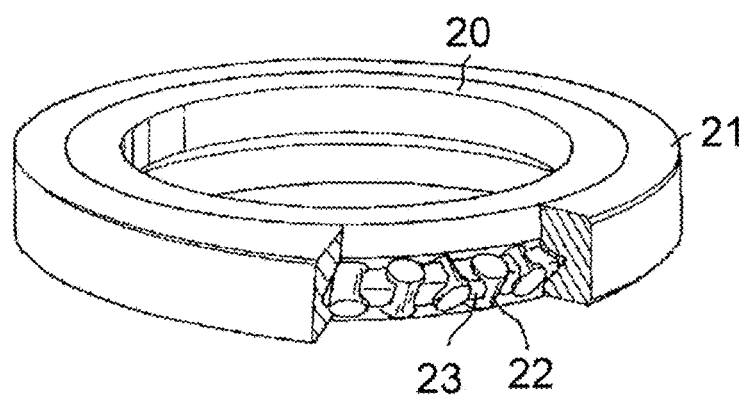
FIG. 4 is a diagram that shows an embodiment of a cross roller ring that can use the clean-environment grease of the present invention.

The cross roller ring described, for example, in Japanese Patent Application Laid-open No. H11-245128 is an example of a cross roller ring that can be lubricated using the grease composition of this embodiment. A specific example is the configuration described in FIG. 4, which is provided with an outer ring (21); an inner ring (20) capable of rotation relative to the outer ring; and a plurality of rollers (22), which are housed, with the axes of roller rotation intersecting, in a roller circulation pathway between an outer ring side roller rolling contact region formed in the outer ring and an inner ring side roller rolling contact region formed in the inner ring.

An example of such a cross roller ring is a configuration in which the outer ring side roller rolling contact region and the inner ring side roller rolling contact region are each a groove having an approximately 90° V-shape and a retainer (23) is interposed between adjacent rollers. This configuration is favorably used in large-scale devices where high loads are applied because a single ring can bear a load in any direction, e.g., a radial load, an axial load, and a moment load.

When, for example, a lubricant reservoir groove is disposed in the outer ring of the cross roller ring in order to lubricate the cross roller ring with a grease, the grease is retained for an extended period and a lubricated state is maintained for an extended period even in the absence of a lubricant fill, i.e., this can contribute to freedom from maintenance.

The grease composition of this embodiment can be applied to a cross roller ring using a method that uses, for example, a grease gun, or using a method in which the grease composition of this embodiment is impregnated into the retainer itself.

A precision table device is an example of a motion guiding device equipped with the above-described cross roller ring lubricated with the grease composition of this embodiment.

Figure 5:
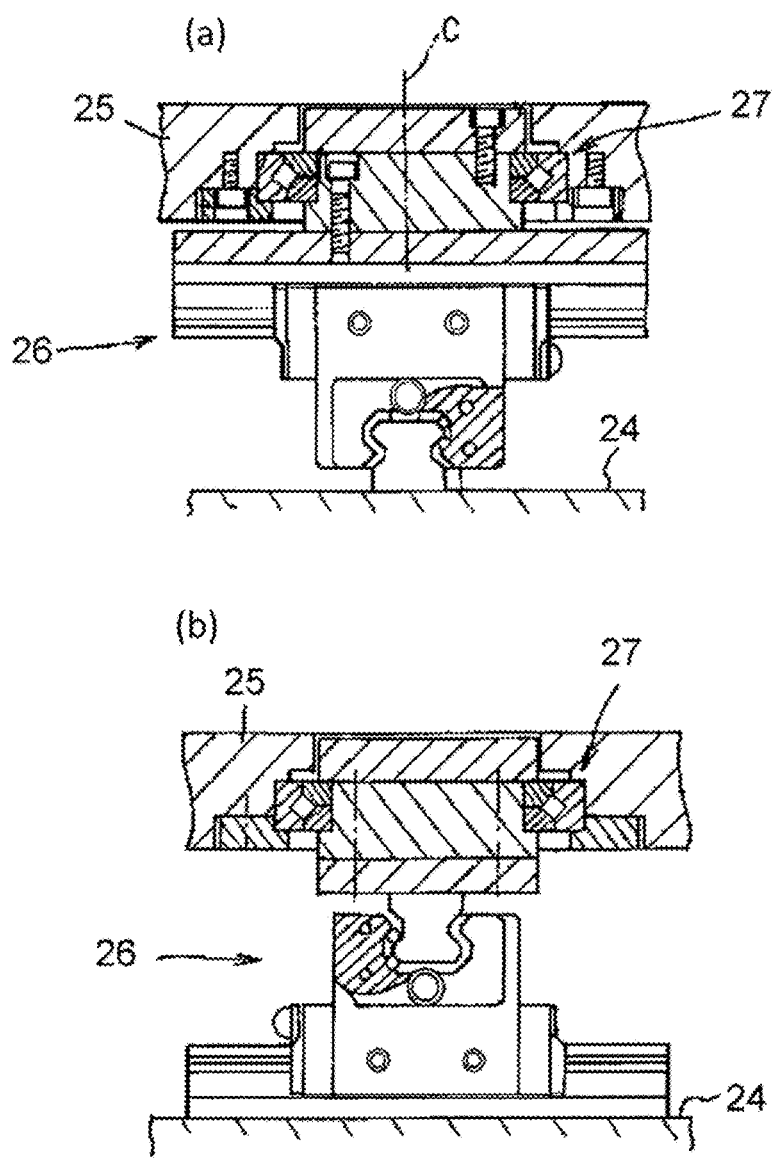

This precision table device can be exemplified by the table device provided with two parallel shafts and one turning shaft, that is described in Japanese Patent Application Laid-open No. H11-245128. As shown in FIG. 5, this table device provided with two parallel shafts and one turning shaft is provided with a motion guiding mechanism that has a biaxial parallel motion guide element (27) for supporting a table (25) to enable parallel motion relative to a base (24) at the same attitude in two axial directions that intersect with each other and a turning motion guide element (27) that rotatably supports the table (25) and is disposed in the biaxial parallel motion guide element (27) at the opposite side from the base (24). A configuration in which the above-described linear guide is used as the biaxial parallel motion guide element and the above-described cross roller ring is incorporated in the turning motion guide element (27) is an example of this motion guiding mechanism for the purpose of obtaining a high rigidity.

The grease composition of this embodiment can also be used in, for example, a machining center, manipulator, semiconductor production equipment, or rotary drive device used in the joint or turning element of a manufacturing robot, that incorporate a cross roller ring as described above.

The rotary drive device can be exemplified by the rotary drive device described in Japanese Patent Application Laid-open No. 2010-84842.

The grease composition of the present invention exhibits both a high load bearing capacity and an excellent performance with regard to low dust emission, when used to lubricate a device subject to high loading, for example, a large-scale manufacturing robot, in particular at a manufacturing facility where stringent air conditioning management is exercised. In particular, flaking in the Z-axis and on components in indirect regions is prevented, for example, in manufacturing robots that are used in clean environments.

EXPLANATION OF REFERENCE NUMERALS 1 track rail
1a, 1b rolling element rolling groove
2 moving block
2a, 2b load rolling element rolling groove
3 ball
4a, 4b load rolling element rolling groove
5 cover
6 end seal
7 inner seal
8 side seal
9 grease nipple
10 moving stage
11 housing member
12, 13 opening
14, 15 dustproofing belt
20 inner ring
21 outer ring
22 roller
23 retainer
24 base
25 table
26 biaxial parallel motion guide element
27 turning motion guide element
100 linear actuator

The invention claimed is:

1. A grease composition for a clean environment, comprising a base oil, a thickener, and an extreme-pressure agent, wherein:
   the grease comprises:
   1) a base oil in an amount of 40 to 95 mass % with respect to the total grease composition and the base oil has a kinematic viscosity at 40 degrees Celsius of 100 to 300 mm$^2$/s; and the base oil comprises:
      a) at least 50 mass % of the base oil with respect to the total amount of the base oil is a hydrocarbon type synthetic oil; and
      b) the base oil is a mixture of a higher viscosity base oil having a kinematic viscosity at 40 degrees Celsius of 350 to 1600 mm$^2$/s and a lower viscosity base oil of less than 350 mm$^2$/s at 40 degrees Celsius, and at least 25 mass % of the base oil as a whole is the higher viscosity base oil; and
   2) a lithium complex soap thickener in an amount of 20 to 40 mass % with respect to the total amount of the composition wherein the lithium complex soap thickener comprises at least 50 mass % of a fatty acid component of a hydroxy carboxylic acid; and
   3) an extreme pressure agent which comprises at least one selected from the group consisting of molybdenum dithiocarbamates, molybdenum dithiophosphates, zinc dithiophosphates, and zinc dithiocarbamates, and the content of the extreme pressure agent is 0.1 to 10 mass % with respect to the total amount of the grease composition; and
   wherein the grease composition has a worked penetration of 200 to 400.

2. The grease composition for a clean environment according to claim 1, wherein the base oil comprises at least one selected from the group consisting of mineral oils in which the paraffin fraction is at least 80 mass %, hydrocarbon-type synthetic oils, alkylphenyl ethers, and esters.

3. The grease composition for a clean environment according to claim 1, wherein the content of the thickener is 20 to 35 mass % with respect to the total amount of the composition.

4. The grease composition for a clean environment according to claim 1, wherein the lithium complex soap is obtained by carrying out a reaction between lithium hydroxide and a fatty acid and a complexing agent in the base oil, wherein the base oil has when production of the lithium complex soap is carried out, a kinematic viscosity at 40° C. of at least 250 mm$^2$/s.

5. A motion guiding device that is lubricated by the grease composition for a clean environment according to claim 1.

* * * * *